United States Patent [19]
Sternbergh

[11] Patent Number: 6,132,044
[45] Date of Patent: Oct. 17, 2000

[54] FILTER FOR A SPECIAL PURPOSE LENS AND METHOD OF MAKING FILTER

[75] Inventor: James H. Sternbergh, Webster, N.Y.

[73] Assignee: Luxottica Leasing S.p.A, Agordo, Italy

[21] Appl. No.: 09/197,362

[22] Filed: Nov. 20, 1998

[51] Int. Cl.[7] .................................................. G02C 7/10
[52] U.S. Cl. ............................................ 351/163; 359/586
[58] Field of Search .................................... 351/163, 165; 359/586, 587, 589, 359

[56] References Cited

U.S. PATENT DOCUMENTS

| | | | |
|---|---|---|---|
| Re. 33,729 | 10/1991 | Perilloux | 359/359 |
| 3,382,183 | 5/1968 | Donoian et al. | 351/163 |
| 3,586,423 | 6/1971 | Zeltzer | 351/39 |
| 3,701,590 | 10/1972 | Zeltzer | 351/39 |
| 3,731,993 | 5/1973 | Piringer | 351/165 |
| 3,736,050 | 5/1973 | Bolum | 350/316 |
| 3,877,797 | 4/1975 | Thornton | 351/44 |
| 4,140,370 | 2/1979 | Snaper | 350/128 |
| 4,278,736 | 7/1981 | Kamerling | 428/437 |
| 4,288,250 | 9/1981 | Yamashita | 501/78 |
| 4,300,819 | 11/1981 | Taylor | 351/41 |
| 4,351,681 | 9/1982 | Kamerling | 156/99 |
| 4,354,739 | 10/1982 | Scanlon | 350/311 |
| 4,521,524 | 6/1985 | Yamashita | 501/64 |
| 4,663,562 | 5/1987 | Miller | 313/478 |
| 4,666,250 | 5/1987 | Southwell | 350/166 |
| 4,769,347 | 9/1988 | Cook | 501/64 |
| 4,802,755 | 2/1989 | Hensler | 351/163 |
| 4,844,607 | 7/1989 | Andrea | 351/243 |
| 4,952,046 | 8/1990 | Stephens | 351/163 |
| 5,051,821 | 9/1991 | Vittot | 358/81 |
| 5,061,659 | 10/1991 | Ciolek | 501/64 |
| 5,077,240 | 12/1991 | Hayden | 501/67 |
| 5,190,896 | 3/1993 | Pucilowski | 501/64 |
| 5,218,386 | 6/1993 | Levien | 351/163 |
| 5,259,057 | 11/1993 | Cook | 385/120 |
| 5,319,472 | 6/1994 | Hill | 358/500 |
| 5,351,332 | 9/1994 | Cook | 385/116 |
| 5,359,675 | 10/1994 | Siwoff | 382/54 |
| 5,369,453 | 11/1994 | Chen | 351/163 |
| 5,400,175 | 3/1995 | Johansen | 359/361 |
| 5,438,024 | 8/1995 | Bolton | 501/55 |
| 5,446,007 | 8/1995 | Krashkevich | 501/64 |
| 5,450,201 | 9/1995 | Katzir | 356/369 |
| 5,451,393 | 9/1995 | Leversidge | 424/9.45 |
| 5,558,942 | 9/1996 | Itoh | 428/426 |
| 5,625,427 | 4/1997 | Araujo et al. | 351/163 |
| 5,694,240 | 12/1997 | Sternbergh | 351/163 |
| 5,728,456 | 3/1998 | Adair | 428/216 |
| 5,729,323 | 3/1998 | Arden | 351/163 |
| 5,740,078 | 4/1998 | Cheetam | 364/526 |
| 5,774,202 | 6/1998 | Abraham | 351/177 |

FOREIGN PATENT DOCUMENTS

| | | |
|---|---|---|
| 0833203A1 | 4/1998 | European Pat. Off. . |
| 1958480 | 11/1969 | Germany . |
| WO 90/05321 | 5/1990 | WIPO . |

OTHER PUBLICATIONS

"D–15 Performance with Short Wavelength Absorbing Filters in Normals" by Thomas, et al., *Amer. Journal of Optometry & Physiological Optics*, 1988, vol. 65, No. 9, pp. 697–702.

"Visual Pigments and Color Blindness" by Rushton, pp. 64–74.

*Color Mixture and Cone Photopigments*, Sunderland Mass: Sinauer Associates, 1981, pp. 113–127, 222–269.

"Visual Pigments of Single Primate Cones" by Marks, et al., *Science*, vol. 143, pp. 1181–1183.

"Effect of Short Wavelength Absorbing Filters on Farnsworth–Munsell 100 Hue Test and Hue Identification Task Performance" by Kuyk, et al., *Optometry & Vision Science*, vol. 67, No. 7, pp. 522–531.

*Primary Examiner*—Huy Mai
*Attorney, Agent, or Firm*—Arent Fox Kintner Plotkin & Kahn PLLC

[57] ABSTRACT

A filter and method for making a filter for enhancing a person's ability to differentiate between different shades of a spectral color of interest involves obtaining spectral data for the different shades and plotting the data on a chromaticity diagram. The standard deviation of the data is determined and a merit function based on the standard deviation is developed. Filters having positive merit functions are deemed appropriate candidates for the special purpose lens.

23 Claims, 8 Drawing Sheets

FILTER FOR A SPECIAL PURPOSE LENS AND METHOD OF MAKING FILTER

BACKGROUND OF THE INVENTION

The present invention relates to optical filters for special purpose lenses. More specifically, the present invention relates to a method for designing a filter with regard to how effectively it enhances the contrast between different shades of the same spectral color.

In the optics field, color measurement is an extensive subject on which many treatises and books have been written. Color measurement is a useful tool in many areas of industry, examples of which include color discrimination for quality control; contrast enhancement in CRT screens; testing of samples for non-conformities (e.g., forged instruments); and color matching of paints and other colored products.

The color of an object is based in part on how the object absorbs the visible spectrum of light. While certain wavelengths of light are absorbed, other wavelengths are reflected which impinges upon the retina of the human eye. The human eye has three photopigments located in the cones of the retina, which allow for color perception: protos for red; deuteros for green; and tritos for violet. Stimulation of the three photopigments in varying proportions and combinations provide sensitivity and perception to all other colors in the electromagnetic radiation spectrum. The wavelength range of color in the electromagnetic spectrum is widely considered to be between approximately 390 nm and 770 nm.

The wavelength bandwidth of each spectral color is regarded in the art generally as follows:

TABLE 1

| Spectral Color | Violet | Blue | Green | Yellow | Orange | Red |
| --- | --- | --- | --- | --- | --- | --- |
| Wavelength Bandwidth | 390–455 nm | 455–492 nm | 492–577 nm | 577–597 nm | 597–622 nm | 622–770 nm |

The human eye does not perceive all wavelengths of color evenly. Rather, the normal human eye response peaks at approximately 560 nm (green), sloping off to the right and left of the spectrum, resulting in what is referred to in the art as the bell-shaped photopic response curve of the human eye (see FIG. 1). The human eye can thus perceive the color green more effectively than other colors of the spectrum. It is also known, however, that not all people perceive colors exactly the same. For example, a common defect of eye, referred to as "color blind", causes some people to confuse the colors red and green. Color perception is also affected by the illuminating light source.

Due to differences in ambient lighting conditions and color perceptions between different people, the International Commission on Color Illumination ("CIE") was founded to help develop color matching standards for use by those working in the color matching industry. These CIE standards are used in conventional color matching equations. For example, there is the CIE standard observer 2° (small (fovea) sample) and 10° (large (retina) sample), as well as "standard illuminants" $D_{65}$, A and C. These standards, together with direct measurement of the reflectance (R) of a sample using a spectrophotometer, are parameters used in well-known color matching calculations to provide the CIE Color Scale Parameters X, Y and Z (also referred to as "tristimulus" values). The standard observer is represented as x, y and z in the color matching equations for the three additive primaries red, green and blue, respectively. The tristimulus values X, Y and Z are used to yield color coordinates x and y for plotting on the CIE chromaticity coordinate graph which defines the color space of the sample in two dimensions. The basic color matching equations are as follows:

$$X = \Sigma S_{(\lambda)} \times R_{(\lambda)} \times x_{(\lambda)}$$

$$Y = \Sigma S_{(\lambda)} \times R_{(\lambda)} \times y_{(\lambda)}$$

$$Z = \Sigma S_{(\lambda)} \times R_{(\lambda)} \times z_{(\lambda)}$$

Where $S_{(\lambda)}$, $x_{(\lambda)}$, $y_{(\lambda)}$ and $z_{(\lambda)}$ are standardized CIE values and $R_{(\lambda)}$ is the measured reflectance of the object.

And for the chromaticity coordinates:

$$x = \frac{X}{X+Y+Z}$$

$$y = \frac{Y}{X+Y+Z}$$

It is known that perceived color can be altered by changing the spectral response curve of the sample through the use of filters. Filters act to change the spectral response curve by altering the transmission of chosen wavelengths of color. The term "contrast enhancement" has been used by some in the art with respect to distinguishing between different spectral colors. There have thus been filters proposed which block wavelengths located between certain colors so as to eliminate the wavelengths which "bridge" two or more spectral colors of interest, thereby enhancing the contrast between the colors of interest. See, for example, U.S. Pat. No. 3,877,797 issued to Thorton, Jr. on Apr. 15, 1975. The '797 patent teaches enhancing color discrimination between differently colored objects with a filter which blocks selected bands of color wavelengths, for example at 490 nm and 590 nm.

The use of filters to alter spectral response curves has applications in the eyewear industry as illustrated by the '797 patent. Other filters used in eyewear applications may be seen in the following patents:

U.S. Pat. No. 4,802,755 issued to Bausch & Lomb Incorporated on Feb. 7, 1989

U.S. Pat. No. 5,438,024 issued to Bausch & Lomb Incorporated on Aug. 1, 1995

U.S. Pat. No. 5,190,896 issued to Schott Glass Tech., Inc. on Mar. 2, 1993

U.S. Pat. No. 5,446,007 issued to Schott Glass Tech., Inc. on Aug. 29, 1995

U.S. Pat. No. 5,077,240 issued to Schott Glass Tech., Inc. on Dec. 31, 1991

U.S. Pat. No. 5,218,386 issued to Levien on Jun. 8, 1993

It may be realized from the above patents that contrast enhancement in eyewear applications is primarily intended for "special purpose" eyewear rather than the more common "general purpose" eyewear. Special purpose eyewear is used for conditions expected at a particular environment, e.g., the bright, white conditions on ski slopes. The present assignee has marketed a special purpose lens known as "ACE" for use on the golf course which is the subject of the '240 patent above. The ACE lens is a purple lens with a high neodymium content which is known for natural absorption of spectral bands resulting in enhancement of amber, red and green. The ACE lens is thus useful for distinguishing between these different spectral colors which was thought to enhance perception of different colors found on a golf course. While this lens helped distinguish between different colors of amber, red and green, it was not specifically designed to enhance the contrast between different shades of the predominant spectral color found on a golf course, namely, green.

Another past approach to contrast enhancement in eyewear is to block the shorter wavelength blue light which is easily scattered by moisture or dust in the air on foggy or hazy days, resulting in interference with spectral colors of interest. The present assignee Bausch & Lomb marketed the B-15 Brown lens; the Ambermatic lens, the RB-50 lens, as well as other lenses in the brown/amber family to reduce haziness, improve contrast and sharpen details. Other "blue-blocking" lenses may be seen in U.S. Pat. Nos. 4,878,748; 5,177,509; and 5,400,175, all issued to Suntiger, Inc.

The above sampling of patents reveals how those skilled in the art have defined "contrast enhancement", as well as the general approach to achieving such contrast enhancement in a lens. Specifically, the term "contrast enhancement" has meant sharpening the details of a viewing field through a filter which act to reduce or eliminate chosen spectral bands to "enhance" other spectral colors of interest. While this approach has proven useful in applications where enhancement between different spectral colors is important, it has been found by the inventor herein that such an approach to filter design could actually produce deleterious effects on distinguishing between different shades of the same spectral color.

There thus remains a need for a special purpose lens which enhances different shades of the same spectral color. For example, on a golf course, there are many different shades of the color green. A golfer which "reads" the different greens correctly has an advantage over a golfer who cannot perceive subtle differences between the different shades of greens on a golf course. There are of course other environments having different predominant spectral colors for which a special purpose lens having the ability to enhance the different shades of the spectral color would be useful. Examples include sporting environments such as an outdoor sand volleyball court and ski slopes where the predominant color may be white, gray or yellow.

SUMMARY OF THE INVENTION

The present invention provides a filter for enhancing different shades of a predetermined spectral color, and a method for making the filter. The term "contrast enhancement" as used herein to describe the inventive method and filter, means the filter operates to improve the viewer's ability to discriminate between different shades of the same spectral color.

In a first aspect, the inventive method involves the following basic steps:
 a) measuring the spectral response of more than one shade of a predominant spectral color in a predetermined viewing field,
 b) plotting the measured spectral responses on a chromaticity coordinate graph and determining the standard deviation of the measured spectral responses,
 c) providing a filter which increases the standard deviation.

By increasing the standard deviation, the different measured shades of the spectral color are moved further apart on the chromaticity diagram. This translates into a further differentiation in the measured shades which is perceived by the eye.

This inventive approach to filter design provides a filter which acts to reduce the transmission of the predominant spectral color. Surprisingly, this approach is antithetical to prior art methodology of filter design for contrast enhancement as described above. In the prior art, it was thought by those skilled in the art that contrast enhancement was achieved by eliminating/reducing the wavelengths of colors which "bridged" (along the spectrum) the color or colors of interest. The thinking was that by taking out the "bridging" colors, the color or colors of interest was/were more "pure" by not being interfered with by colors having wavelengths which bridged the color or colors of interest.

The approach of the instant invention to filter design does not target and reduce the "bridging" colors to enhance a color of interest, but rather targets and reduces the color of interest itself. By reducing the color of interest, different shades of that color are enhanced due to the "flattening" effect this has on the spectral response curve of the retina. Without reducing the spectral color of interest, the eye is "overwhelmed" by that color to a degree that perception of subtle differences in shades of that color is frustrated. This is especially true of the color green, since the eye sees the color green the best as described above (see FIG. 1). As a result, a person with an unaided eye viewing an object field where the predominant color is green is inundated with green. By providing a filter which reduces the spectral color green, the response curve to the eye is flattened, and the different shades of green can be perceived more clearly.

DETAILED DESCRIPTION

The present invention provides a filter for enhancing the differences between different shades of the same spectral color. "Shades" of a spectral color are defined herein as a bandwidth extending on either side of a "pure" spectral color wavelength which includes components of the spectral color of interest as well as spectral colors adjoining opposite sides of the spectral color of interest. For example, in Table 1 above, the wavelength bandwidth of the spectral color green is 492–577 nm where "pure" green is regarded generally in the art to be at about 560 nm. The colors adjoining green on either side are yellow and blue. Thus, for wavelengths ranging from about 492 to about 559, there are components of green and blue, and for wavelengths ranging from about 561 to about 577, there are components of green and yellow. Each incremental nanometer in the wavelength band may thus be considered a different shade of the same spectral color, in this example, green, with "pure" green being at about 560 nm.

The same may be said for each spectral color in the electromagnetic spectrum and it is understood that the present inventive filter and method may be applied to any spectral color of interest. Thus, although the invention is described herein with reference to the color green, the invention is not so limited, and may be used for enhancing different shades of any spectral color of interest.

Figure 1:
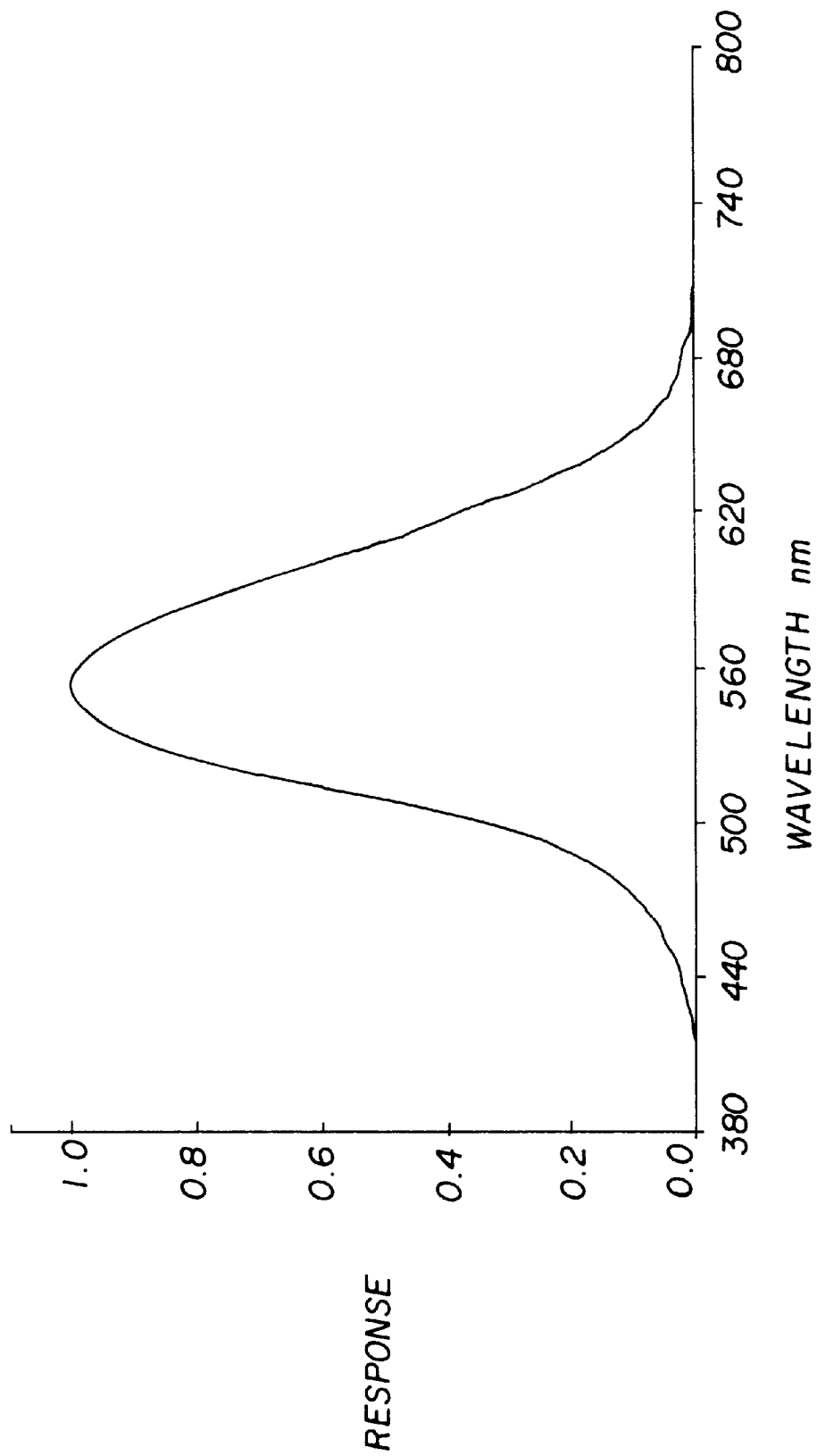
FIG. 1 is the spectral sensitivity curve of the human eye.

Referring to FIG. 1, the photopic response curve of the unaided human eye is shown to have 100% sensitivity at a wavelength of 560 nm (+/− about 5 nm) which is recognized in the color art to be pure green. Thus, the human eye perceives the spectral color green better than it perceives other colors.

Figure 2:
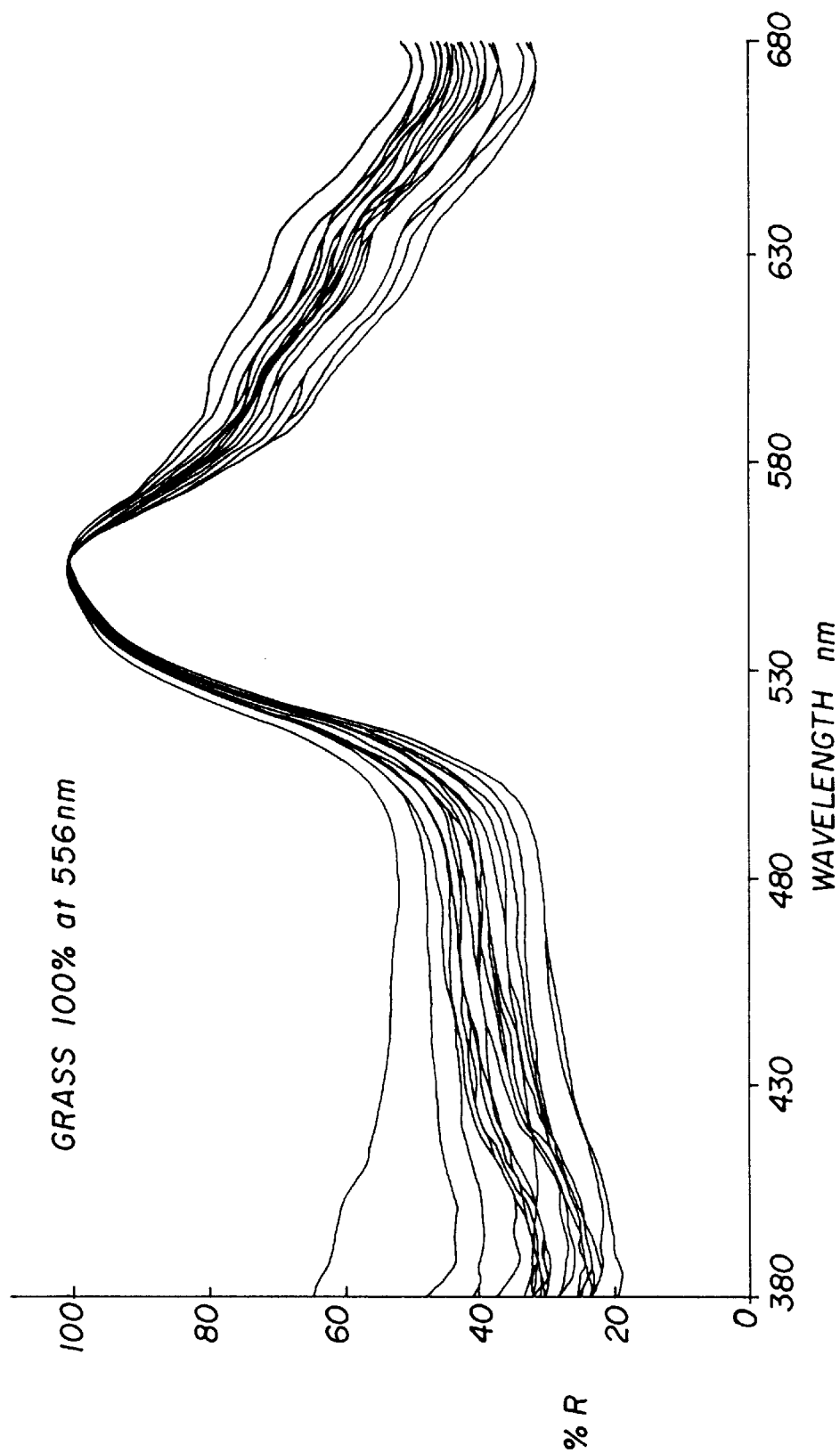
FIG. 2 are spectral response curves form a golf course.

Referring to FIG. 2, spectral curves of grass are shown to have a common 100%R peak at about 556 nm, with the curves having increasing differentiation extending in opposite directions of 556 nm. At 556 nm, the eye is perceiving 100% reflectance of pure green when viewing grass. This, coupled with the fact that the eye is highly sensitive to the color green, means that the eye is being overwhelmed with the color green, making it very difficult to perceive the subtle differences in the shades of green on either side of 556 nm.

Figure 3:
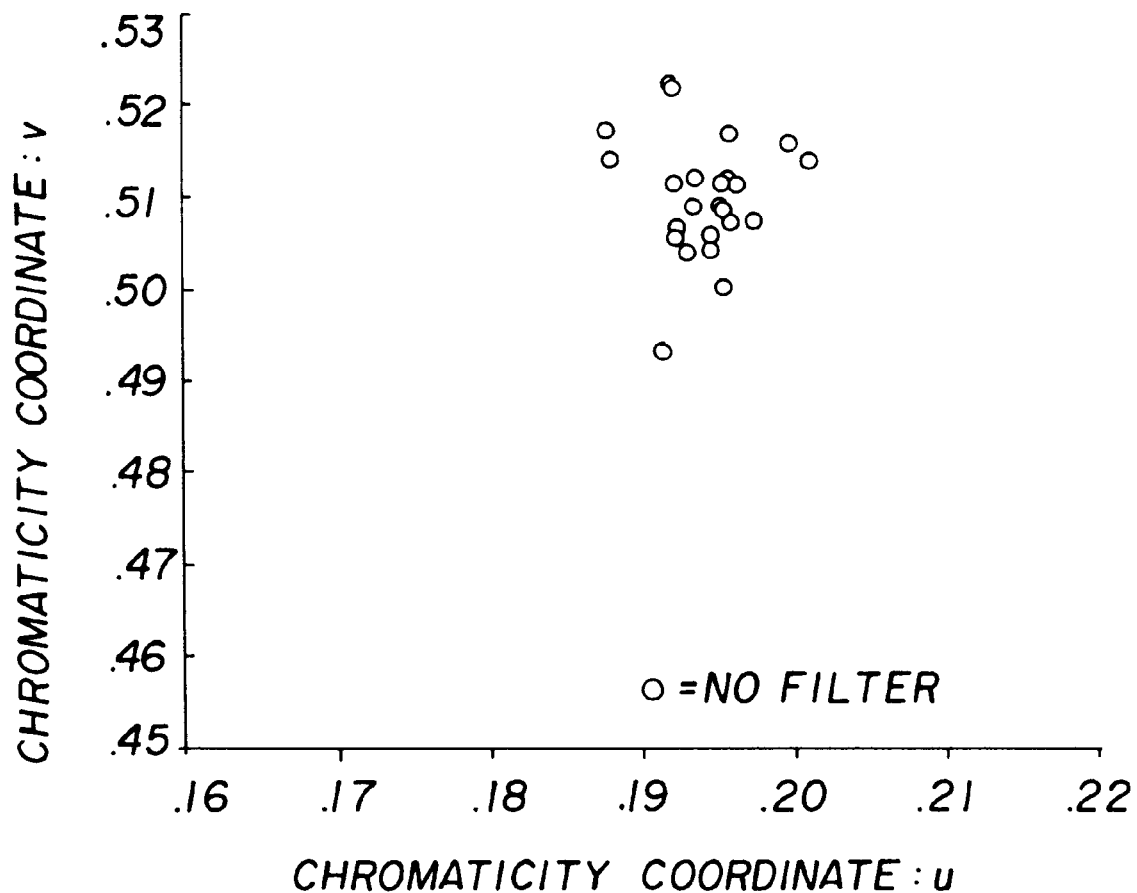
FIG. 3 is a chromaticity diagram of spectral data obtained from a golf course with the unaided eye.

Referring to FIG. 3, twenty-four (24) spectral data points of different greens of a golf course (e.g., fairway, putting green, rough, etc.) are plotted on a chromaticity diagram. CIE recognizes chromaticity coordinates u and v which nay replace the older chromaticity coordinates x and y to yield more accurate color matching results. This chromaticity coordinate system is described in the CIE literature. It will be noticed that the data points of FIG. 3 are clustered rather closely together. This translates into a difficulty for a human observer to differentiate between the greens represented by the different data points. It will be appreciated that although 24 data points are shown herein for purposes of illustration, the number of data points taken may vary as desired.

According to the present invention, the standard deviation of the data points is calculated and a merit function is developed based on the standard deviation. If a filter used to take the same spectrographic data results in an increase of the standard deviation, a positive merit function results. If the filter acts instead to decrease the standard deviation, a negative merit function results. For example, if the standard deviation of the data points of FIG. 3 is 5, and a filter acts to increase the standard deviation to 6, then the merit function is (6−5)/5 or ⅕ which is a positive 20%. A filter which acts to increase the standard deviation receives a positive merit function and is potentially suitable for purposes of the present invention. Conversely, if the filter acts to decrease the standard deviation to 4, the merit function is (4−5)/5 or negative ⅕ which is a negative 20%. Any filter which acts to decrease the standard deviation has a negative merit function and is not a suitable filter for the purposes of the present invention.

The merit indices of the following prior art commercial lenses were calculated as follows:

| NCl Gray | Corning Brown | Schott filter s8008G | Sanwa Yellow | Oakley M-Frame Brown |
|---|---|---|---|---|
| −7.8 | −16.2 | −80.0 | −30.2 | −16.4 |

The negative merit indices of these prior art lenses indicates they are not suitable for the purposes of a "greens differentiation" lens according to the present invention, even though they have been marketed as such. This further illustrates how the past approach to filter design can actually be deleterious to one's ability to differentiate between different shades of the color green, in this instance.

It may thus be appreciated that a positive merit function is good because an increase in standard deviation of the data points means that the chromaticity of the data points has been further differentiated, resulting in improved perception of the different data points by the observer looking through the filter.

Figure 4:
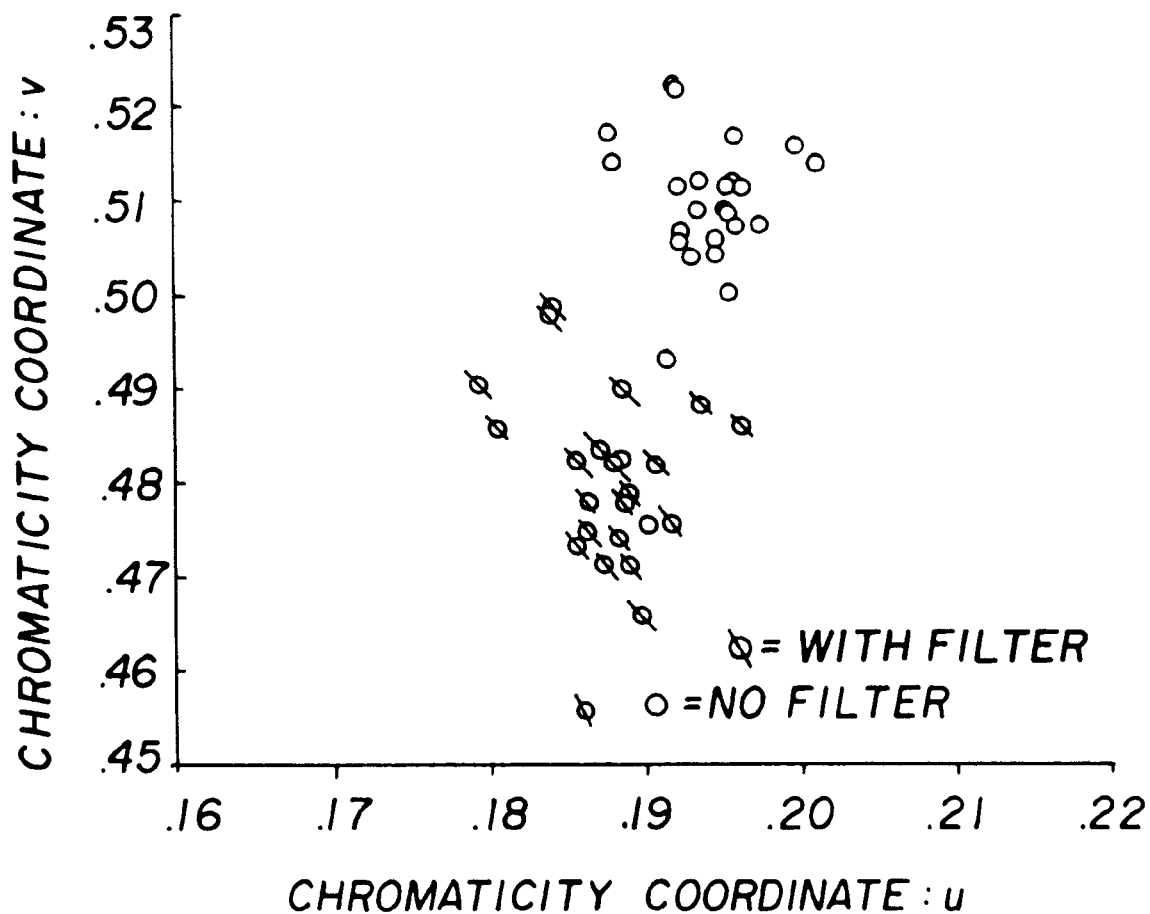
FIG. 4 is a chromaticity diagram of spectral data obtained from a golf course with a filter made according to the present invention.

Referring to FIG. 4, a comparison of the data points of FIG. 3 (unaided eye), and the same greens as seen through a filter of the present invention is provided. It is seen that the data points of the filter are spread further apart than the data points of the greens with no filter (i.e., the filter produces an increase in the standard deviation of the data points). Perception of the differences in the shades of green represented by the data points is thus improved with the filter.

Figure 5:
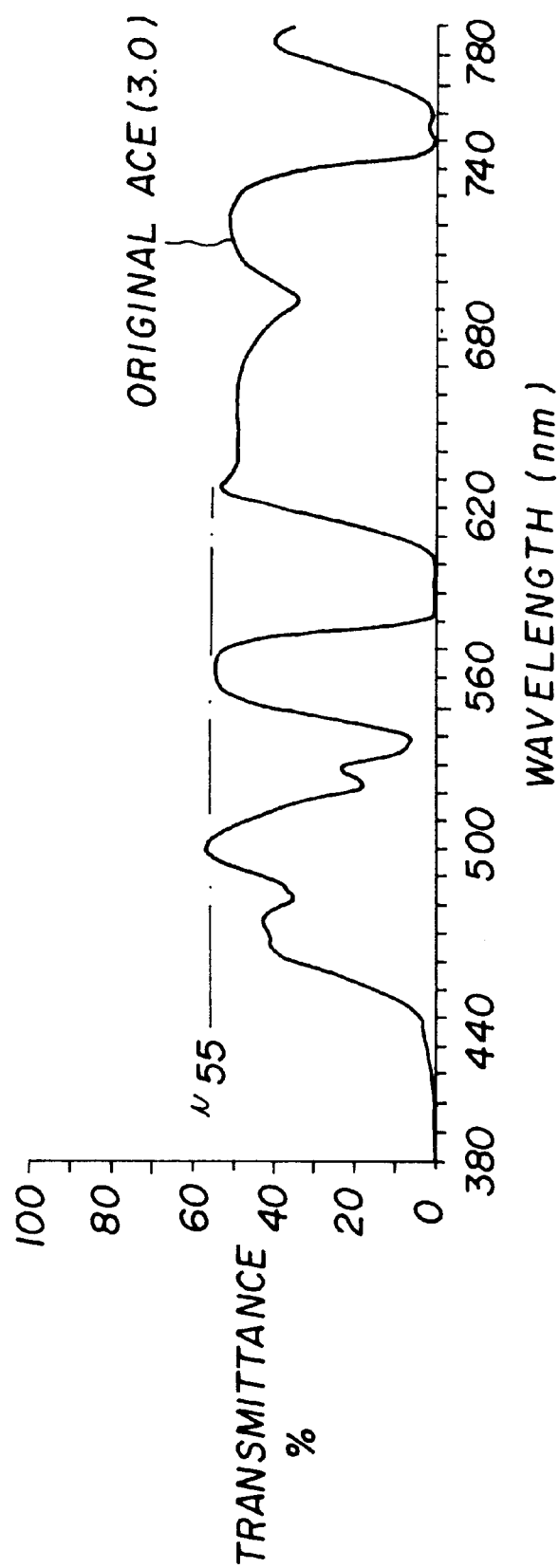
FIG. 5 is the spectral response curve of the lens of the prior art ACE lens.
Figure 6:
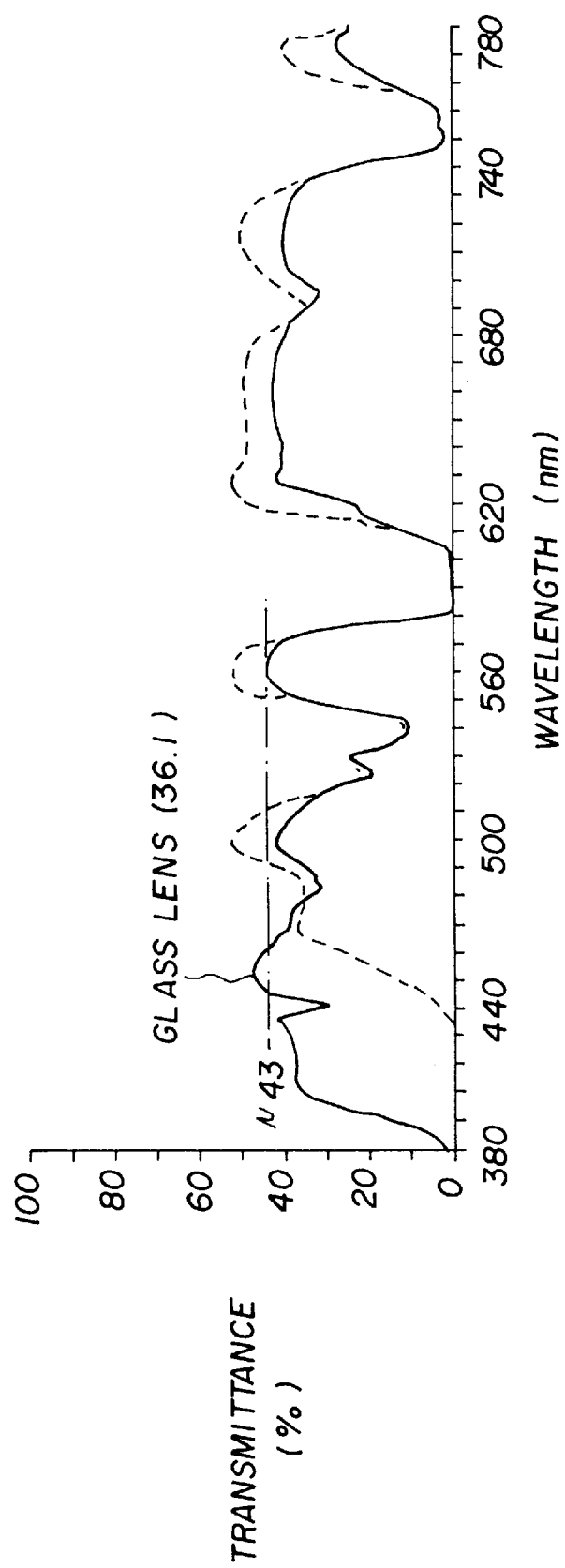
FIG. 6 is the spectral response curve of a glass lens made according to the present invention (solid line) compared to the spectral response curve of the prior art ACE lens of FIG. 5 (dashed lines)
Figure 7:
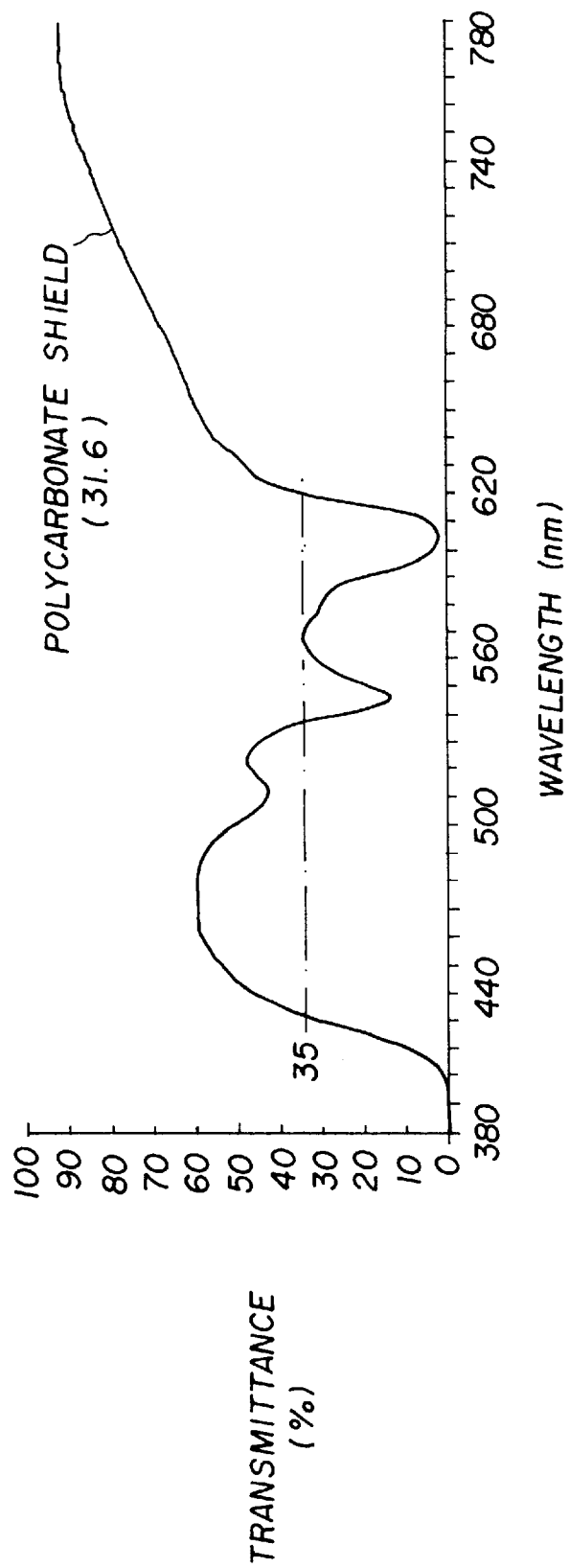
FIG. 7 is the spectral response curve of a polycarbonate lens made according to the present invention.

Referring to FIGS. 5–7, the spectral curves of the prior art lens is provided and compared with the spectral curves of glass, polycarbonate, and thin film coated lenses having filter characteristics in conformance with the present invention.

In the prior art glass lens of FIG. 5, it is seen that the spectral curve has a "cut-on" at about 430 nm (i.e., there is 0% transmission below about 430 nm) and transmission peaks of about 55% at about 500 nm, 560 nm and 630 nm. This glass thus completely blocks much of the blue spectrum while passing more than half of the green spectrum.

In comparing this prior alt lens with the glass lens of the present invention seen in solid lines in FIG. 6, it is seen that the present glass lens has positive transmission beginning at about 380 nm, with a transmission of about 43% at 560 nm.

It may thus be realized that the filter of the present invention has a lower transmission in the green spectrum (about 43%) proximate 560 nm than the prior art lens (about 55%). Yet, surprisingly, the filter of the present invention has a much higher merit index of 36.1 than the merit index of the prior art lens which is 3.0. The higher merit index translates into a larger increase in the standard deviation of the data points as explained above, thus enhancing perception of the different shades of the spectral color represented by the different data points. Thus, the present invention shows that lowering transmission of the spectral color of interest acts to enhance perception of the different shades of that color by further differentiating the chromaticity of the different shades. This is a completely new approach to filter design as discussed in the Background and Summary sections hereof.

Figure 8:
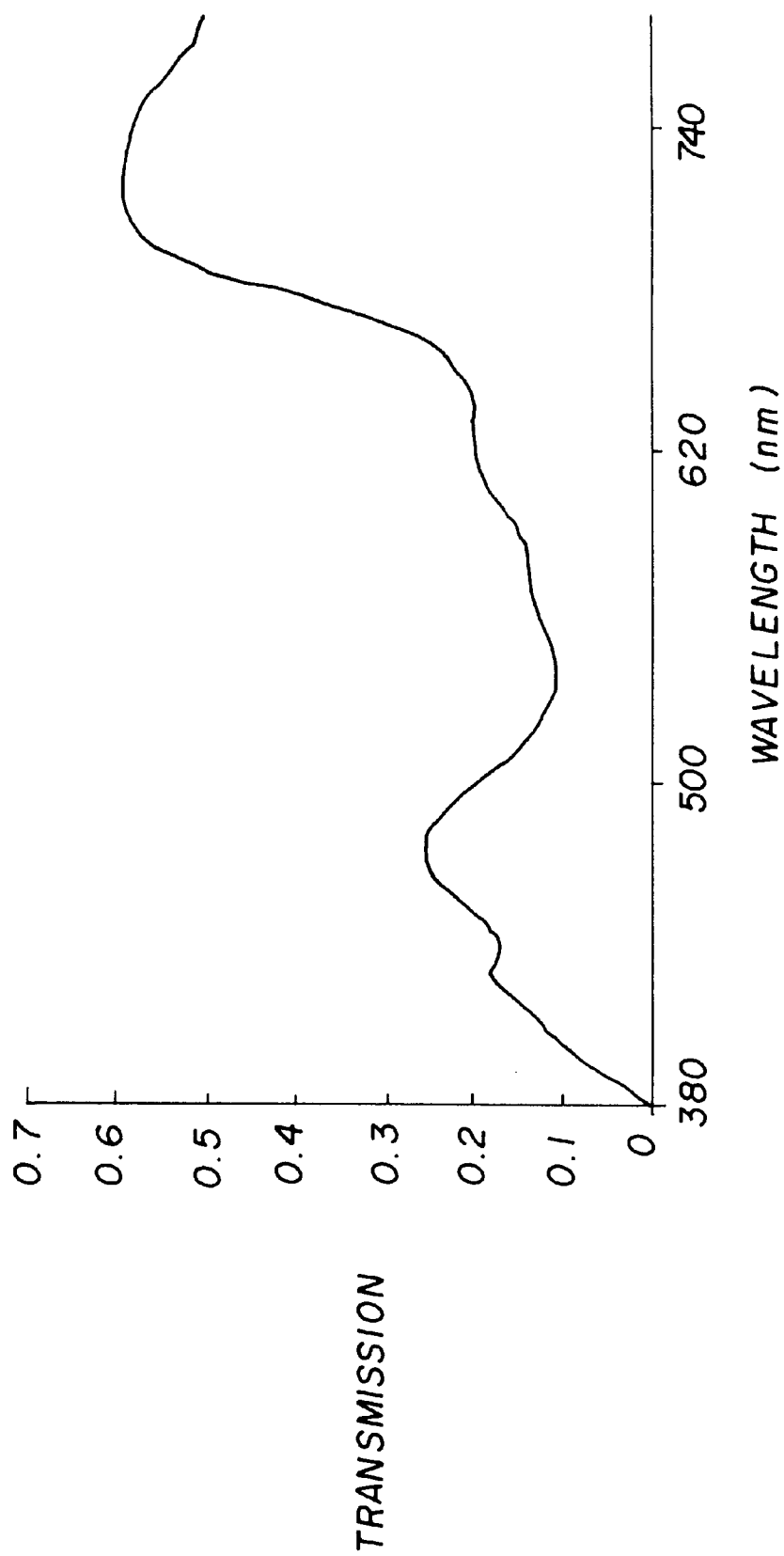
FIG. 8 is the spectral response curve of a thin film lens made according to the present invention.

Another reason for the large difference between the merit indices of the inventive glass lens and the prior art glass lens may be attributed to the transmittance of wavelengths in the blue region of the spectrum in the inventive glass lens, and the lack of transmission in the prior art lens. The prior art approach to contrast enhancement was to block blue light because it was believed that blue light interfered with other colors of interest (see the Suntiger patents, supra). Conversely, the inventive lens transmits in the blue region of the spectrum as seen in FIGS. 6, 7 and 8. As seen in FIG. 2, the different data curves of the greens data differentiate further toward the opposite ends of the color spectrum. Thus, by allowing these regions to transmit through the inventive filter, the ability to differentiate the green shades which are most distant from 560 nm is enhanced.

Referring to FIG. 7, it is seen that a polycarbonate lens made according to the present invention has a "cut-on" transmission at about 410 nm, a transmission of about 35% at about 560 nm and has a merit index of 31.6. This lens also transmits much of the red portion of the spectrum.

Referring to FIG. 8, it is seen that a glass lens having a thin film coating made according to the present invention has a "cut-on" transmission at about 380 nm; a transmission of about 15% at about 560 nm, and has a merit index of 35.8. This lens also transmits much of the red portion of the spectrum. A thin film coating having the following composition was developed which gives the sprectral response seen in FIG. 8:

2H 1L 2H

Where H is any high index material such as TiO2, ZnS, and ZrO2, for example.

And L is a low index material such as SiO2 or MgF2, for example.

While the spectral curves of lens filters made according to the present invention may differ, the transmission of the spectral color of interest will usually always be less than 50% yet greater than zero, of course. Generally speaking, the lower the transmission in the wavelength of interest, the higher the mer it index will be. However, other factors must be considered to select an appropriate lens for the desired application. For example, a lens having a very high merit index may result in a commercially unacceptable color for the lens. Also, the consumer typically does not want their vision through the lens to be outrageously affected, e.g., by seeing some colors too intensely. These factors must therefore also be considered when choosing the appropriate spectral curve of the lens.

What is claimed is:

1. An eyewear lens for enhancing chromatic differences between different spectral shades of a predetermined spectral color in the electromagnetic spectrum, comprising:

a filter for variably transmitting through the lens the wavelengths of said different spectral shades of said spectral color in a maximum transmittance range of about 10% to about 45% out of 100% of the electromagnetic spectrum.

2. The lens of claim 1 wherein said transmittance range is more preferably about 15% to about 45%.

3. The lens of claim 2 wherein said transmittance range is most preferably about 15% to about 43%.

4. The lens of claim 1 wherein said predetermined spectral color is green having a spectral wavelength of 560 nm and a spectral shade bandwidth extending from about 540 nm to about 600 nm.

5. The lens of claim 4 wherein said spectral shade bandwidth extends from about 540 nm to about 580 nm.

6. The lens of claim 4 wherein said spectral shade bandwidth extends from about 550 nm to about 600 nm.

7. The lens of claim 1 wherein said filter has a non-zero transmittance throughout the visible spectrum.

8. The lens of claim 7 wherein said filter has a transmittance of about 30% at about 440 nm.

9. The lens of claim 7 wherein said filter has a transmittance of about 25% at about 480 nm.

10. The lens of claim 9 wherein said lens has a transmittance of about 15% at about 560 nm.

11. The lens of claim 10 wherein said lens has a thin film coating consisting essentially of the following layers in the following order:

one layer of a high index of refraction material;
   one layer of a low index of refraction material; and
   one layer of high index of refraction material.

12. The lens according to claim 11 wherein said high index of refraction material is selected from the following group:
   TiO2; ZnS; and
   ZrO2.

13. The lens according to claim 11 wherein said low index of refraction material is selected from the following group:
   SiO2 and MgF2.

14. The lens according to claim 11 wherein said thin film coating is comprised of the following stacked layers:
   TiO2
   SiO2
   TiO2.

15. The lens according to claim 14 wherein the thicknesses of the TiO2 layers are about 167 nanometers and the thickness of the SiO2 layer is about 137 nanometers.

16. The lens according to claim 15 wherein the Quarterwave thicknesses of the TiO2 layers is about 2 at 800 nanometers, and the quarterwave thickness of the SiO2 layer is about 2 at 800 nanometers.

17. The lens of claim 1, wherein said spectral shade bandwidth is not more than about 100 nm.

18. A method for making an optical filter which enhances the chromaticity between different shades of a predetermined spectral color of a predetermined object field, said method comprising the steps of:

a) measuring the spectral reflectance of a plurality of said different shades of said spectral color and plotting the data points of the different shades on a chromaticity diagram;

b) calculating the standard deviation of said data points and developing a merit function based on said standard deviation;

c) providing a filter which increases said standard deviation.

19. The method according to claim 18 wherein said predetermined object field is a golf course and said predetermined spectral color is green.

20. The method according to claim 18 wherein said predetermined object field is a ski area.

21. The method according to claim 18 wherein said predetermined object field is a volley ball court.

22. The method according to claim 18 wherein said predetermined object field is in an industrial setting.

23. A lens having an optical filter which enhances the chromaticity between different shades of a predetermined spectral color of a predetermined object field, said lens made according to a method comprising the steps of:

a) measuring the spectral reflectance of a plurality of said different shades of said spectral color and plotting the data points of the different shades on a chromaticity diagram;

b) calculating the standard deviation of said data points and developing a merit function based on said standard deviation;

c) providing a filter which increases said standard deviation.

* * * * *